J. H. NIENHUSER, Jr.
BEET PULLER.
APPLICATION FILED FEB. 14, 1916.
1,196,881.
Patented Sept. 5, 1916.
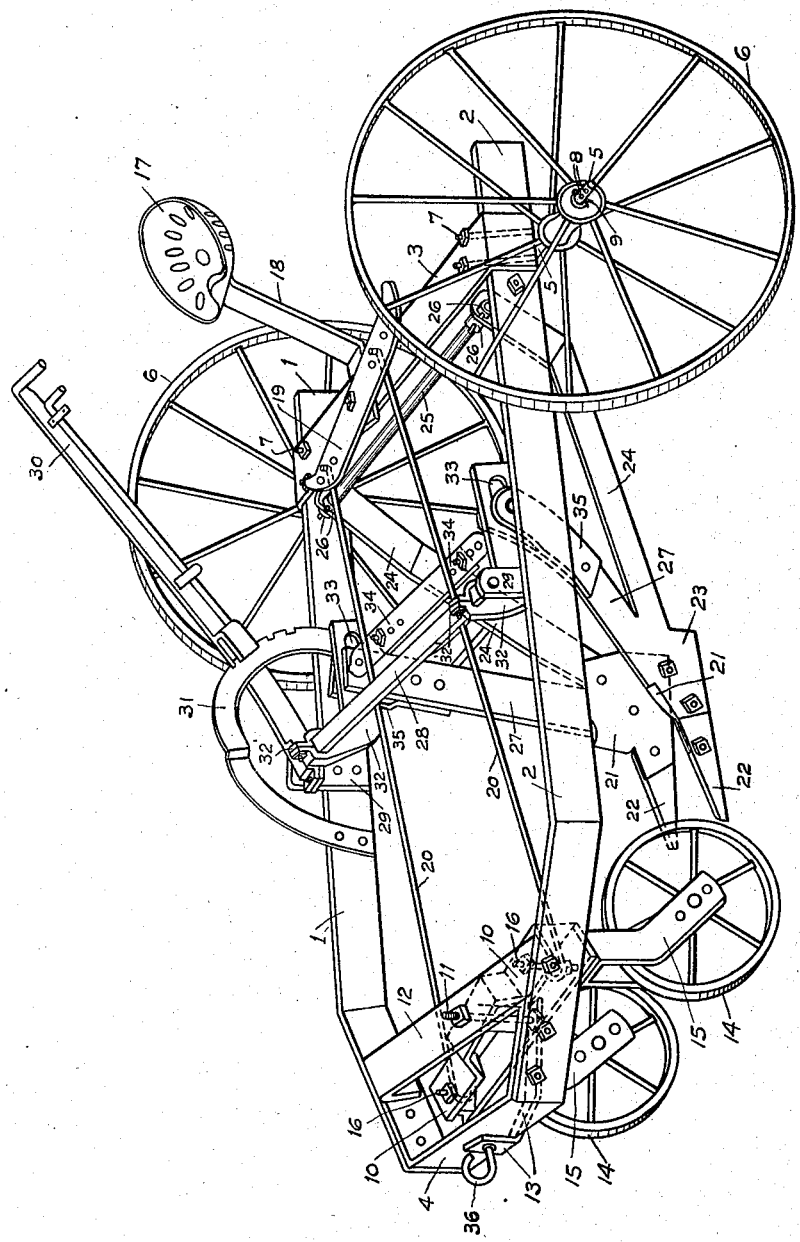
WITNESSES:
JOHN H. NIENHUSER, JR. INVENTOR.
BY
Claude C. Coffin.
ATTORNEYS.

UNITED STATES PATENT OFFICE.

JOHN H. NIENHUSER, JR., OF GREELEY, COLORADO.

BEET-PULLER.

1,196,881.     Specification of Letters Patent.      Patented Sept. 5, 1916.

Application filed February 14, 1916. Serial No. 78,201.

*To all whom it may concern:*

Be it known that I, JOHN H. NIENHUSER, Jr., a citizen of the United States, residing at Greeley, in the county of Weld and State of Colorado, have invented a new and useful Beet-Puller, of which the following is a specification.

My invention relates to improvements in farming implements used in the harvesting of beets or other root crops, and relates especially to improvements in implements for the pulling of sugar beets.

The objects of my improvement are to provide a substantial implement of relatively simple construction, easily assembled, easily handled and operated, and easily turned at the end of a field, having no neck weight and of light draft, and having a wide range of adjustment to meet all conditions of soils, size and depth of beets and distance between rows. I attain these objects by the implement illustrated in the accompanying drawing, in which the figure shows a perspective view of the implement.

In general, my beet puller is of the class consisting of a frame carried on wheels, with the plow puller suspended under the frame.

In the drawing, 1 and 2 are the side pieces of the main frame, which may be suitable heavy strap iron set on edge.

3 is a flat rear cross piece lapped at its ends over the side pieces 1 and 2, and anchored to the rear axle of the implement by means of U-bolts 7, or in other suitable manner.

4 is a head piece across the front of the frame and bolted to the side pieces 1 and 2. The rear end of the frame is supported by and carried on a transverse axle 5 extending across under the frame with rear wheels 6 at its outer ends at the sides of the frame.

The axle 5 is so constructed that the rear wheels 6 may be spread or placed closer together, as may be necessary to properly space them to run between beet rows. This may be accomplished in a simple manner, as shown, by making the axle 5 extend some distance outward beyond the sides of the frame and providing a series of holes 8 along the extending ends of the axle to receive retaining pins 9, both outside and inside of the wheels 6. The wheels 6 may thus be placed on the axle at the desired position and the retaining pins inserted in the proper holes outside and inside the wheels, the usual or any desired washers or plates being placed between the wheels and the retaining pins.

The front end of the frame is carried upon a pivoted "crazy" or caster wheel truck, consisting of a braced bolster 10 pivoted at its center on a king bolt 11. King bolt 11 passes through a bridge piece 12 above the bolster, extending across near the front of the frame, and a brace 13 extending from the head piece 4 downward and backward under the bolster. The "crazy" or caster wheels 14 are mounted in yokes 15 under the ends of bolster 10 by head bolts 16 extending through the ends of the bolster. Suitable bearings are provided for the bolster pivoted on the king bolt and for the caster wheels on the head bolts, to allow the bolster and caster wheels to turn freely. The yokes 15 are provided with series of holes to receive the axle of the caster wheels and allow the wheels to be raised or lowered in their yokes to adjust the height of the front of the frame. The ends of the bolster 10 are also provided with series of holes to receive the head bolts 16 to allow proper spacing of the caster wheels for any width of beet row.

A driver's seat 17 is mounted on a seat stem 18 on the rear cross piece 3 of the frame, or at any other suitable or desired place upon the frame. A foot lever 19 is pivoted on the base of the seat stem or elsewhere on the frame where it is easily reached and operated by the foot of the driver, and is operatively connected by one or more guide rods 20 with the bolster 10 of the front truck, so that movement of the lever 19 will turn the front truck one way or the other upon its king bolt, to assist in guiding and turning the implement. Other form of caster wheel trucks or steering means may be provided to support and guide the implement, the form shown and described being no part of the invention claimed herein.

In the adjustment of the position of the wheels, I prefer to have the caster wheels 14 on the front truck straddle one row of beets, the row being pulled, and the back wheels 6 straddle three rows.

The plows to pull the beets consist of a pair of plow bottoms suspended under the frame and arranged to pass along in the soil under each side of a row of beets and lift the beets out of the ground. Each plow bottom consists of a shield 21 and a removable plow point 22 bolted by plow bolts to a double shank 23. The double shanks 23 have diverging brace arms extending upward and backward and outward from the plows and supported at their upper ends in the frame. The rear arms 24 of the double shanks extend well backward and outward from the shank point and are pivoted at their upper ends upon a round transverse shaft 25, extending across the frame and fastened to the side pieces 1 and 2. The pivoting of the rear arms 24 is provided for by having the shaft 25 extend through holes in the upper ends of the arms. Adjustable lock collars 26 are provided on the shaft 25 at each side of each arm 24. The lock collars 26 are to fit snugly against the brace arms 24 to laterally brace the puller plows, and are provided with set screws or clamping bolts to permit adjustment of the rear arms 24 at any desired point on the shaft 25. The forward arms 27 of the shanks 23 do not extend backward or outward as far as the rear arms and are suspended from lever mechanism on the frame, to allow them to be raised and lowered by the operator and thus raise or lower the puller plows.

To accomplish the control and raising and lowering of the plows, a square transverse cross bar 28 is revolubly mounted in posts 29 bolted to the side pieces 1 and 2. To one end of the bar 28 is clamped a ratchet lever 30 working along a slide ratchet 31 to turn and hold the bar 28. Lifting arms 32 are adjustably clamped by clamps 32' to the square cross bar 28 and extend downward and backward, and at their backward ends are provided elongated slots 33 to carry the rounded ends of a transverse adjustable brace rod 34. The rounded ends of the brace rod 34 extend through holes at the upper ends of the forward shank arms 27, and also through the elongated slots in lifting arms 32. Brace straps 35 bolted or riveted to the forward shank arms 27 extend upward and are spread forming yokes at the upper ends of arms 27 to fit snugly over the lifting arms 32, to strengthen and laterally brace the plow shanks. The brace straps 35 are provided with holes at their upper ends, through which the rounded ends of the brace 34 extend. The brace rod 34 is made adjustable in length, as by two lapping pieces bolted together to allow of adjustment of the width between the plow bottoms. The lifting arms 32 may be loosened at the clamps 32' on the cross bar 28 and slipped along the bar to any desired position to adjust the space between the plow points. A suitable clevis or hook 36 is provided on the head piece 4 to which the horses or other motive power may be hitched.

It will thus be seen that the relative position of the two plow bottoms may be adjusted by slipping the lifting arms 32 along the bar 28 and shortening or lengthening the brace rod 34, and placing the rear arms 24 at the desired position on shaft 25. The adjustment of the relative position of the plows and the widening or closing of the wheels, as explained above, allows the setting of the plows and the implement for any size of beets and width of row. The depth of the plow when in operation is controlled by the lever 30.

In operation the implement may be used with or without a tongue, the only practical necessity of a tongue being to assist in backing the implement to start at the end of a row. The guiding of the implement to insure the pulling plows running symmetrical with the row is accomplished by turning the pivoted bolster 10 by the foot lever 19. Should the plows tend to run to one side of the row, or either plow draw too near a row, it can be thrown back to position by turning the front truck one way or the other as necessary.

At the end of a field the plows are lifted from the ground by throwing the lever 30 upward and forward, thus swinging the plow bottoms in the arc of a circle about the shaft 25 as a center. By having the plow points tip upward upon starting to lift the plows, they tend to raise themselves out of the ground and make the lifting of the plows easy. After the plows are thus raised from the ground, the horses or motive power is turned and the side draft on the front of the frame will cause the caster wheels to turn and allow the implement to be turned in its own space. After the implement is turned and made to straddle the row to be pulled, it is backed, if necessary, to the end of the row and the plows lowered into the ground by a backward movement of the lever 30, as the implement is pulled forward.

The plow points 22 are easily removable, and can be easily and quickly replaced when they become dull.

I claim:

1. In a beet puller, a frame carried on wheels, a beet plow mounted under said frame on a double shank, said shank consisting of a rear arm pivoted at its upper end to said frame, and a forward arm hung in said frame by means adapted to raise and lower said shank.

2. In a beet puller, a frame carried on wheels, a beet plow mounted under said frame on a double shank, said shank having forward and rear arms diverging from said plow upward and outward to said frame, the rear arm thereof being pivoted to said frame, a lifting arm pivoted to the upper end of the forward arm of said shank and operatively connected with a controlling lever to raise and lower said forward arm.

3. In a beet puller, a frame carried on wheels, a beet plow supported under said frame by a double shank, having forward and rear arms, said rear arm being pivoted to said frame near the rear thereof, and said forward arm being hung from said frame by means to raise and lower said forward arm and swing said plow in an arc of a circle about the pivot of the rear arm as a center, substantially as described.

4. In a beet puller, a frame carried on wheels and adapted to straddle a row of beets, a pair of beet plows mounted under said frame and adapted to plow beneath each side of a row of beets, each of said plows having a shank with forward and rear arms extending upward and backward and outward from the plow and fastened at the upper ends in said frame, the rear arms of said shanks being pivoted and laterally adjustable on a transverse shaft extending across said frame, a transverse bar extending across and pivoted in said frame, having lifting arms adjustably set thereon and pivoted to the upper ends of the forward arms of said plow shanks, a lever operatively connected with said transverse bar to turn the same and raise and lower the forward arms of said plow shanks.

5. In a beet puller, a frame carried on wheels and adapted to straddle a row of beets, a pair of beet plows mounted under said frame and adapted to plow beneath each side of a row of beets, each of said plows having a shank with forward and rear arms extending upward and backward and outward from the plow and fastened at the upper ends in said frame, the rear arms of said shanks being pivoted and laterally adjustable on a transverse shaft extending across said frame, a transverse bar extending across and pivoted in said frame, having lifting arms adjustably set thereon and pivoted to the upper ends of the forward arms of said plow shanks, a lever operatively connected with said transverse bar to turn the same and raise and lower the forward arms of said plow shanks, a transverse adjustable brace rod extending between said lifting arms and playing in elongated slots in said lifting arms and supporting said forward shank arms.

JOHN H. NIENHUSER, Jr.

Witnesses:
RUTH CHURCHILL,
J. D. MANDEVILLE.

Copies of this patent may be obtained for five cents each, by addressing the "Commissioner of Patents, Washington, D. C."